United States Patent [19]

Wilkinson et al.

[11] 4,155,436
[45] May 22, 1979

[54] CONTROL MEANS FOR DRIVE EQUIPMENT

[75] Inventors: John J. Wilkinson; Harry Monks, both of Burton upon Trent, England

[73] Assignee: Coal Industry (Patents) Limited, London, England

[21] Appl. No.: 741,309

[22] Filed: Nov. 12, 1976

[30] Foreign Application Priority Data

Sep. 14, 1976 [GB] United Kingdom ............... 37975/76

[51] Int. Cl.² ............................................ F16D 43/00
[52] U.S. Cl. ............................ 192/0.02 R; 192/0.072; 192/2; 318/471; 192/30 W
[58] Field of Search ............. 192/0.02 R, 0.07, 0.072, 192/2 R

[56] References Cited

U.S. PATENT DOCUMENTS

| | | | |
|---|---|---|---|
| 2,280,914 | 4/1942 | Johns | 192/0.02 R X |
| 2,426,071 | 8/1947 | Veinott | 192/0.02 R |
| 2,487,702 | 11/1949 | Goodwillie et al. | 192/0.02 R |
| 2,555,748 | 6/1951 | Coningsby et al. | 192/0.02 R X |
| 3,757,912 | 9/1973 | Ball et al. | 192/0.02 R |
| 4,039,057 | 8/1977 | Monks | 192/0.072 X |

Primary Examiner—Benjamin W. Wyche
Assistant Examiner—David C. Reichard
Attorney, Agent, or Firm—Stevens, Davis, Miller & Mosher

[57] ABSTRACT

The circuit, which controls actuation of a clutch intermediate an electrical motor and a conveyor, is powered from a transformer which taps the power supply to the motor. The circuit contains a relay switch which is operable by a current sensor attached to the power supply line.

14 Claims, 1 Drawing Figure

CONTROL MEANS FOR DRIVE EQUIPMENT

This invention relates to control means for drive equipment particularly to control means for controlling an hydraulically actuated clutch drivably connectable intermediate an electrical drive assembly and a driven assembly.

In particular, though not exclusively, the present invention relates to control means for controlling a clutch drivably connectable intermediate an electric drive motor and a gearbox for a conveyor installed along a working face in an underground mine.

The present invention relates particularly to an improvement in or a modification of, the invention described and claimed in U.S. Pat. No. 4,039,057.

An object of the present invention is to provide improved control means for drive equipment, which tends to be more responsive to operational modes of the electric drive motor.

According to the present invention control means for controlling an hydraulically actuated clutch drivably connectible intermediate an electrical drive assembly and a driven assembly comprises an electrical circuit including an electrical relay switch, a voltage transformer having a primary side connected to a power supply cable to the electrical drive assembly and a secondary side connected to solenoid means to control the clutch; sensor means connected to the power supply cable for sensing if an electrical current is being supplied to the drive assembly and adapted to derive an electrical signal indicative thereof and to actuate the relay switch to make or break the electrical circuit.

Preferably, the control means comprises further sensor means for sensing operational modes of a brake associated with the driven assembly, the further sensor means being adapted to pass or prevent passage of an electrical signal dependent upon the sensed operational mode.

Advantageously, the control means comprises indicator means to indicate when the relay switch is closed.

An embodiment of the invention will now be described by way of example only, with reference to the accompanying drawings in which.

Figure 1:
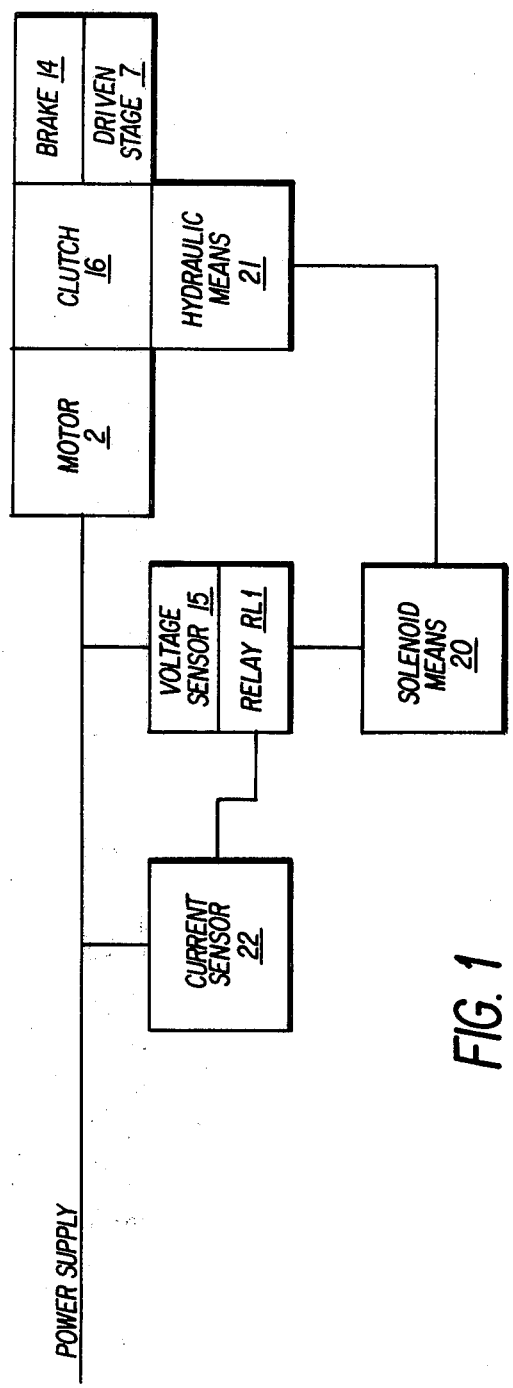
FIG. 1 is a block diagram incorporating the invention.

The present invention finds application, for example, in an underground mining installation. In such an installation conveyors are arranged along underground mineral working faces and along mine roadway tunnels. Referring to FIG. 1, such a conveyor (not shown) is powered by an electrical motor 2 which is drivably connected by means of an hydraulically actuated clutch 16 to a driven stage 7 of the conveyor gearbox. In steep or sloped mine working faces or roadway tunnels, the conveyor has a brake 14 associated therewith. It is necessary in mining installations of the kind described, that when the electrical motor power supply is switched on, then the clutch 16 is operable to ensure drivable engagement between the electrical motor 2 and the driven stage 7. It is also necessary, in steep or sloped mine working faces or roadway tunnels, that the brake is not actuated while the motor is energized so that driving by the electrical motor is not impeded.

Figure 2:
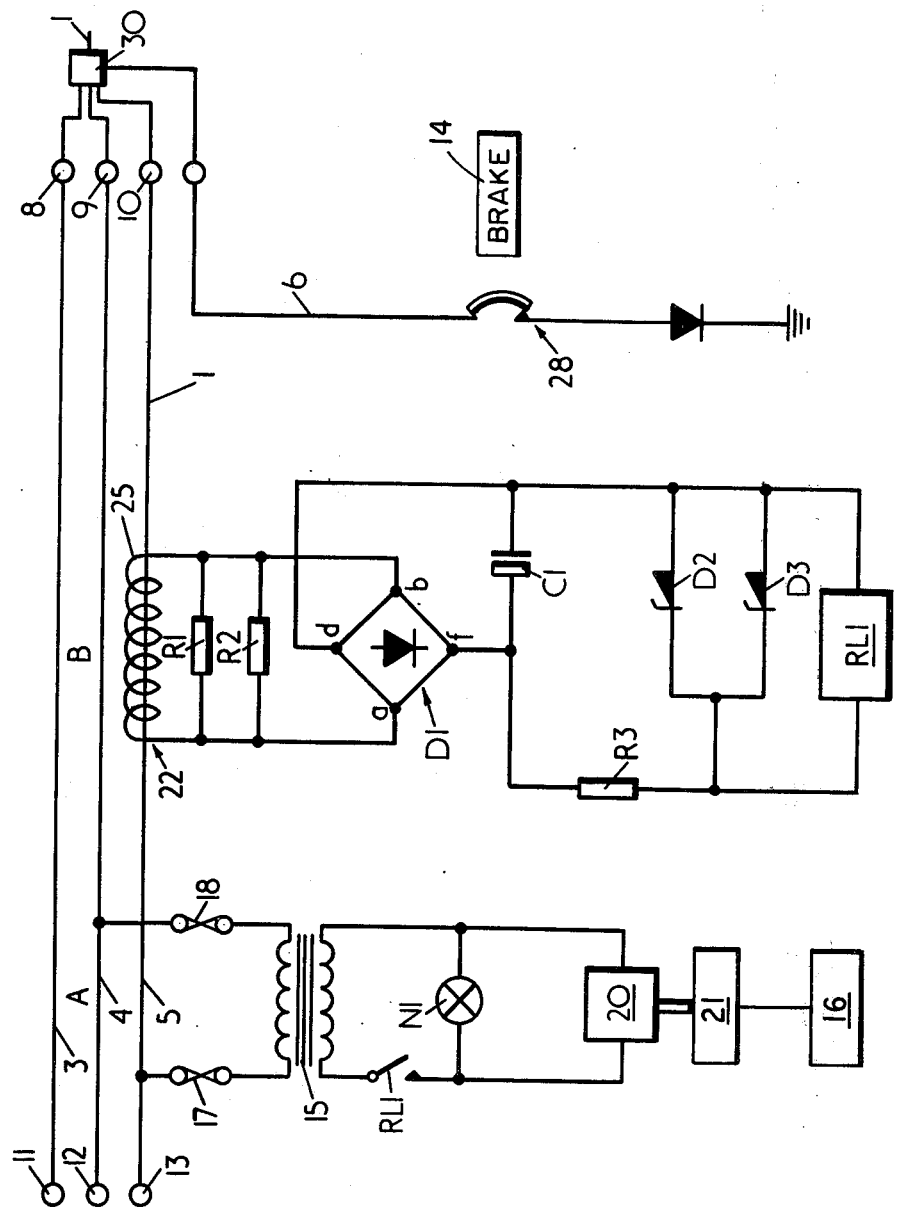
FIG. 2 is an electrical circuit diagram.

Referring now to FIG. 2, a power supply cable 1, comprising power supply lines 3, 4 and 5, is shown joining supply terminals 8, 9 and 10 and electrical motor terminals 11, 12 and 13. The supply lines 4, 5 are tapped at A and are connected to a primary side of a voltage transformer 15. The transformer 15 is protected by fuses 17, 18 connected between the supply lines and the transformer 15.

The secondary side of the transformer is connected to solenoid means 20 via a relay switch RL1. A neon indicator N1 is connected in parallel with the solenoid means. The relay switch RL1 is connected so that when it is closed, a circuit including the transformer 15, the solenoid means 20 and the neon indicator is made and so that in consequence when the supply lines 4, 5 to the motor are live, the solenoid means 20 is actuated and the neon indicator N1 is energized.

The solenoid means 20, is connected to hydraulic pressure fluid feed means 21 (see FIG. 1) arranged to cause the clutch 16 to be actuated resulting in drivable engagement between the electrical motor 2 and the conveyor gearbox driven stage 7.

Consequently, it will be understood that whenever the solenoid means 20 is actuated, then drivable engagement results between the electrical motor and the conveyor gearbox driven stage provided that the relay switch RL1 remains closed.

Unfortunately, as hereinbefore described, the solenoid means 20 would be actuated not only when the electrical motor is actuated, but also in the situation when power to the electrical motor has been recently removed and the electrical motor still continues to revolve due to the kinetic energy thereof which is not immediately dissipated. The solenoid means 20 remains actuated in this situation because back e.m.f. is generated by the motor.

In order to remove this undesirable situation, it is necessary to provide sensor means 22 at B in the supply cable 1 to sense whether electrical current is being supplied to the electrical motor and to derive an electrical signal indicative thereof to control the relay switch RL1. It will be understood that the motor is unable to draw current from the power supply terminals 9, 10 after power supply to the electrical motor has been removed.

For convenience, the relay switch RL1 is shown separately and differently in the two circuits including the transformer 15 and the sensor means 22, respectively. The circuit including the sensor means 22 comprises resistors R1, R2, R3, diode rectifying bridge D1; Zener diodes D2, D3; capacitor C1 and the previously mentioned control side of the relay switch RL1.

The sensor means 22 comprises a current transformer of which the power supply line 5, acts as a single turn primary coil and a coil 25 acts as a secondary coil. Consequently, when the power to the motor is on, the motor current is sensed by the means 22 and a proportion is applied to the parallel burden resistors R1 and R2 by the current transformer.

The voltage derived across the burden resistors R1, R2 is applied across points a, b of the rectifying bridge D1. The rectifying bridge D1 provides a full wave rectified output at points d, f. The output of the rectifying bridge D1 is smoothed by the capacitor C1.

The smoothed output of the rectifying bridge D1 is connected across the relay switch RL1. Voltage across the relay switch RL1 is fixed at a desired level by a value chosen for the resistor R3. Zener diodes D2 and D3 are provided to limit the voltage across the relay switch RL1 to the desired value.

In operation of the control means of the present invention, the solenoid means 20 is energized at all times when power is supplied to the motor, but is de-energized immediately when power is removed from the motor because the relay switch RL1 is opened immediately when the sensor 22 fails to detect current in the power supply line 5 to the motor.

Consequently, the motor will drivably engage the driven stage of the conveyor gearbox only when the clutch is actuated due to the solenoid means 20 being energized.

A thermal switch 28 is provided in a pilot line 6 associated with the supply cable 1. The thermal switch 28 is mounted adjacent the previously mentioned brake associated with a conveyor usually installed in a steep or working face or mine roadway of the kind mentioned. The brake is resiliently biased towards its applied position and it is released hydraulically by the previously mentioned hydraulic pressure fluid feed means, when the solenoid means is energized.

In operation, the thermal switch 28 is adapted to open if the brake starts to overheat. Such overheating is caused when the solenoid means 20 (which controls the feed of pressure to release the brake) is energized and the driven stage of the conveyor gearbox is driven while the brake is even so applied.

The pilot line is connected to a trip switch 30 adapted to be thrown if the pilot line should not conduct, i.e. if the brake should overheat. Throwing of the trip switch has the effect of turning off the power supply to the motor and the motor is therefore stopped.

Consequently, it can be seen that the motor is inoperable while the brake is overheated.

From the above description, it can be seen that control means for controlling an hydraulically actuated clutch drivably connected intermediate an electrical drive assembly and a driven assembly is provided which is responsive to operation modes of the drive assembly.

We claim:

1. Control means for controlling an hydraulically actuated clutch drivably connected intermediate an electrical drive assembly and a driven assembly comprising an electrical circuit including an electrical relay switch, a voltage transformer having a primary side connected to a power supply line feeding the electrical drive assembly and a secondary side connected to solenoid means to control the clutch, a current transformer means coupled to the power supply line for sensing if an electrical current is being supplied to the drive assembly and adapted to derive an electrical signal indicative thereof and to actuate the relay switch to make or break the electrical circuit.

2. Control means as claimed in claim 1, wherein the control means comprises further sensor means for sensing operational modes of a brake associated with the driven assembly, the further sensor means being adapted to pass or prevent passage of an electrical signal dependent upon the sensed operational mode.

3. Control means as claimed in claim 1, wherein the control means comprises indicator means to indicate when the relay switch is closed.

4. Control means as claimed in claim 2, wherein the control means comprises indicator means to indicate when the relay switch is closed.

5. Control means as claimed in claim 4, wherein the signal passed by the further sensor means control a trip switch.

6. Control means as claimed in claim 5, wherein the trip switch controls the power supply to the electrical drive assembly.

7. Control means as claimed in claim 6, wherein the trip switch is closed when the further sensor means allows the electrical signal to pass therethrough, so that power is supplied to the electrical drive assembly.

8. Electric control means for controlling an hydraulically actuated clutch which is part of a machine drive assembly, said assembly comprising an electric motor, a driven member, an hydraulic clutch therebetween with a solenoid means to control said clutch, an electric transmission line feeding said motor, said electric control means comprising:

an electrical relay switch, a voltage transformer having a primary side connected to said transmission line and a secondary side connected to said solenoid means;

current transformer means coupled to said transmission line for sensing if an electric current is being supplied to the motor, the output of said current transformer being connected to said relay so that the relay is open when the supply current is shut off so as to prevent the back EMF of the electric motor from activating said solenoid.

9. In an assembly of a large horsepower electric motor, an hydraulically operated clutch controlled by a solenoid and a driven member, control means to prevent the back EMF of the motor from activating the solenoid when the supply current is cut off, said control means comprising:

(a) a voltage transformer having a primary side connected across the supply line feeding the electric motor and a secondary side connected to said solenoid;

(b) a relay switch connected to interrupt current flow to said solenoid;

(c) current transformer means coupled to the line feeding the electric motor for sensing if an electric current is being supplied to the motor, the output of said current transformer being connected to said relay switch so that when the supply current is shut off the relay switch will interrupt any current flow to the solenoid and thus prevent the back EMF of the motor from activating the solenoid.

10. The control means of claim 9 in which the relay switch is normally open.

11. The control means of claim 9 including a diode rectifying bridge in the circuit between the current transformer means output and the relay switch.

12. The control means of claim 11 including at least one burden resistor connected across the output of the current transformer.

13. The control means of claim 11 including at least one zener diode connected across the output of said rectifying bridge.

14. The control means of claim 11 including at least one capacitor connected across the output of said rectifying bridge.

* * * * *